(12) United States Patent
Takei

(10) Patent No.: US 10,574,332 B2
(45) Date of Patent: Feb. 25, 2020

(54) RADIO COMMUNICATION SYSTEM AND RADIO MONITORING CONTROL SYSTEM

(71) Applicant: Hitachi, Ltd., Chiyoda-ku, Tokyo (JP)

(72) Inventor: Ken Takei, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/933,223

(22) Filed: Mar. 22, 2018

(65) Prior Publication Data

US 2019/0132041 A1 May 2, 2019

(30) Foreign Application Priority Data

Oct. 31, 2017 (JP) .................................. 2017-210086

(51) Int. Cl.

| | |
|---|---|
| *H04B 7/10* | (2017.01) |
| *H04W 4/38* | (2018.01) |
| *H04W 16/24* | (2009.01) |
| *H04W 72/12* | (2009.01) |
| *H04W 84/20* | (2009.01) |

(52) U.S. Cl.
CPC ................ *H04B 7/10* (2013.01); *H04W 4/38* (2018.02); *H04W 16/24* (2013.01); *H04W 72/121* (2013.01); *H04W 72/1289* (2013.01); *H04W 84/20* (2013.01)

(58) Field of Classification Search
CPC . H04B 7/028; H04B 7/10; H04B 7/22; H04B 7/005; H04B 1/16; H04B 1/04; H04L 9/32; H04K 1/08; H04W 12/02; H04W 4/38; H04W 72/121; H04W 72/1289; H04W 16/24; H04W 84/20
See application file for complete search history.

(56) References Cited

U.S. PATENT DOCUMENTS

2015/0381242 A1* 12/2015 Takei ...................... H04B 7/10
375/260
2017/0310379 A1* 10/2017 Takei .................. H04W 56/001

FOREIGN PATENT DOCUMENTS

JP            6-311135 A      11/1994
WO   WO-2016075785 A1 *  5/2016   ............... H04B 7/10

* cited by examiner

*Primary Examiner* — Dong-Chang Shiue
(74) *Attorney, Agent, or Firm* — Crowell & Moring LLP

(57) ABSTRACT

There is provided a radio communication system configured to communicate with the electromagnetic wave. The radio communication system includes a plurality of slave stations, each configured to transmit and receive the electromagnetic wave using the fixed polarized wave, and a master station including an antenna and a base band circuit, the master station configured to identify a polarization direction of the electromagnetic wave reaching the antenna and a slave station transmitting the electromagnetic wave and notify the identified slave station of a communication timing based on an identified polarized direction. The plurality of slave stations include a plurality of slave stations arranged such that electromagnetic waves transmitted from a plurality of slave stations among the plurality of slave stations reach the antenna of the master station in a plurality of different fixed polarization directions.

10 Claims, 12 Drawing Sheets

F I G. 1A
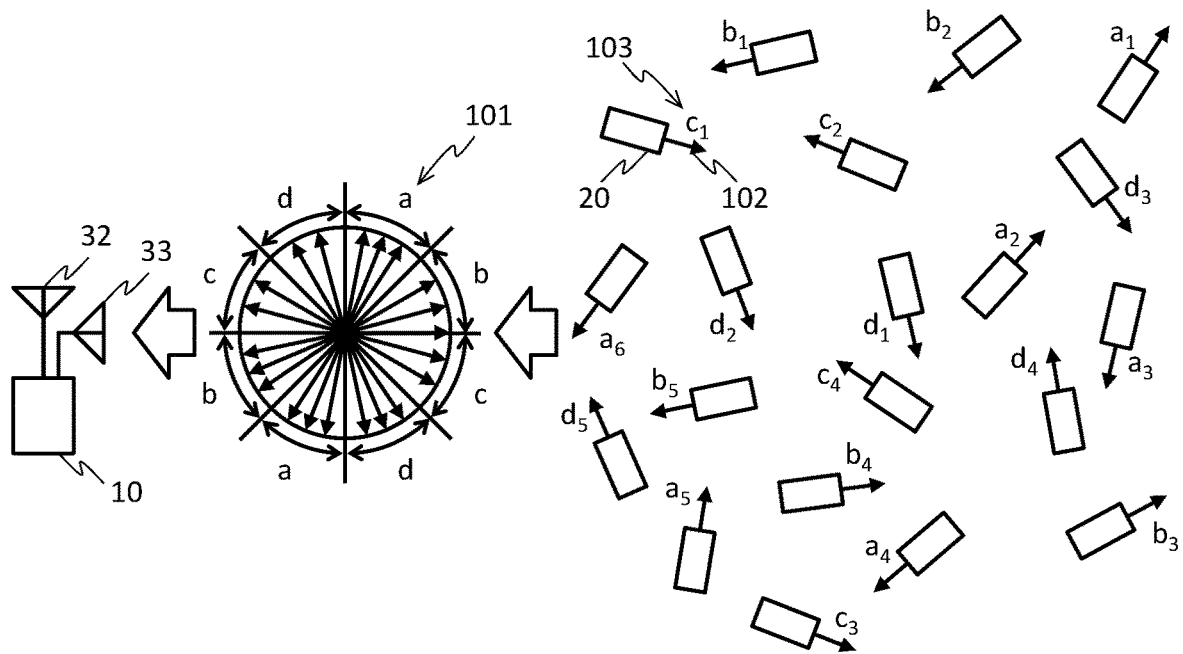
F I G. 1B
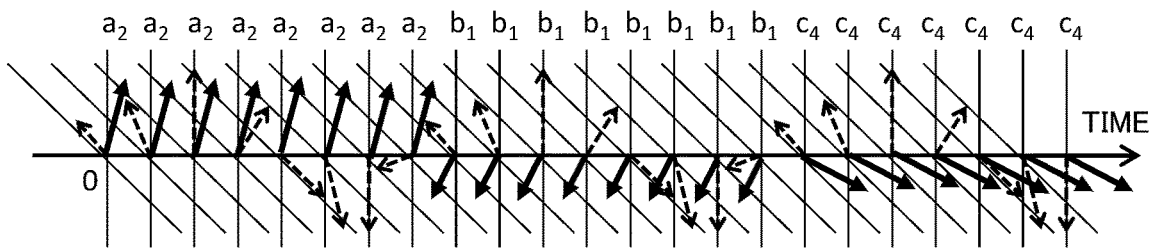
F I G. 1C
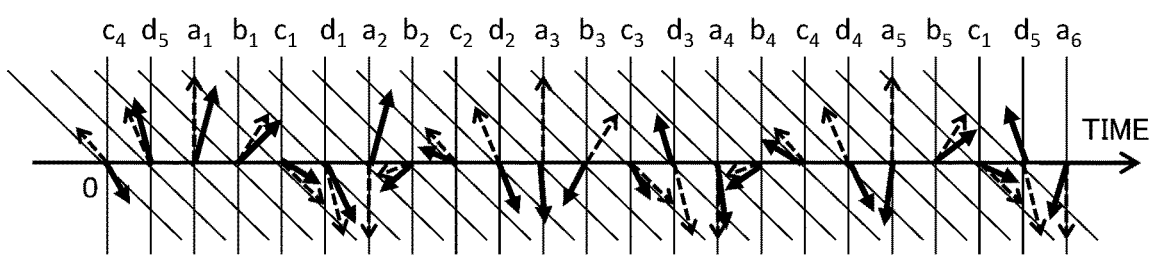

CHANNEL MEASUREMENT MODE

DATA TRANSMISSION MODE

F I G. 8
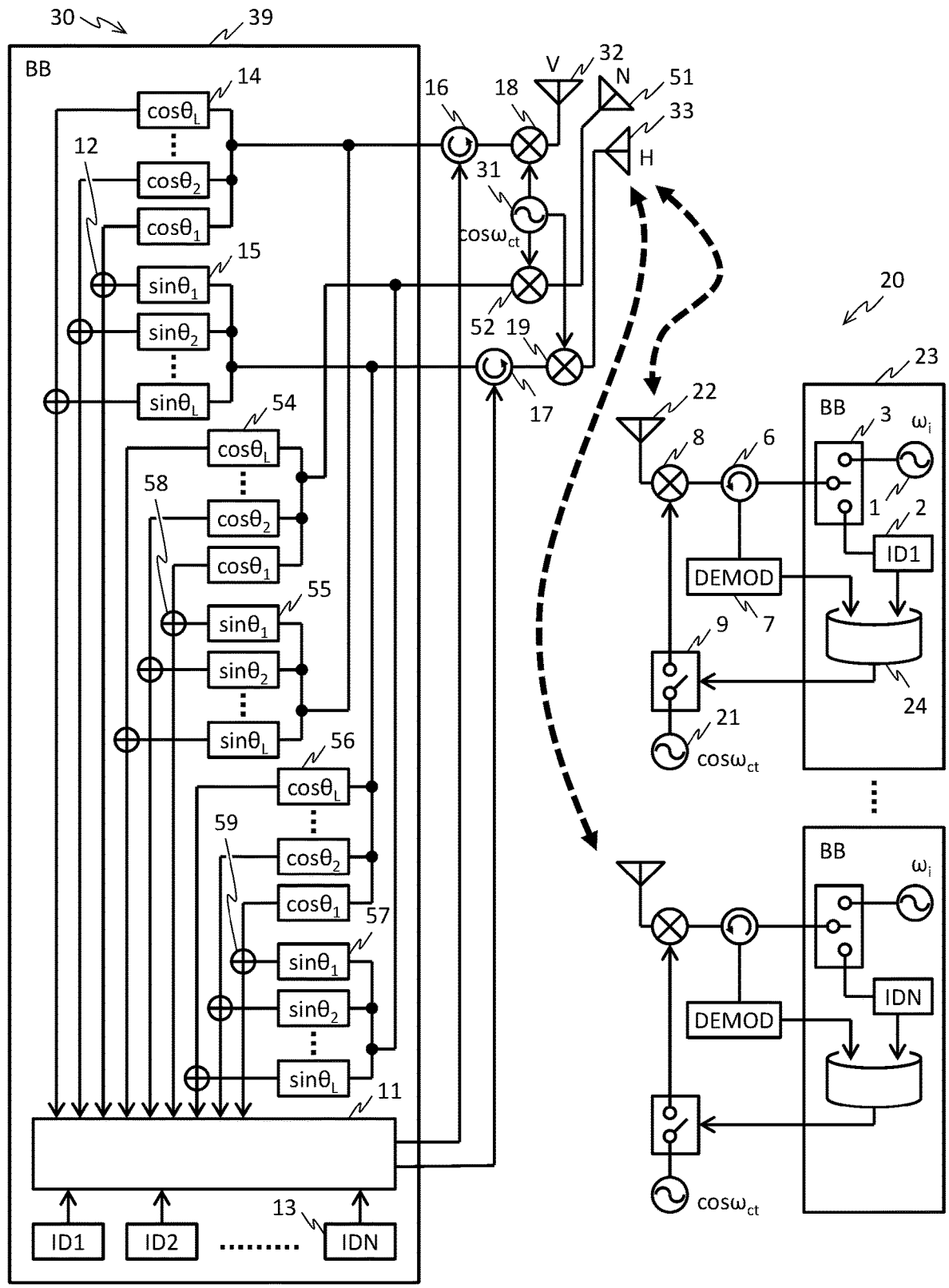

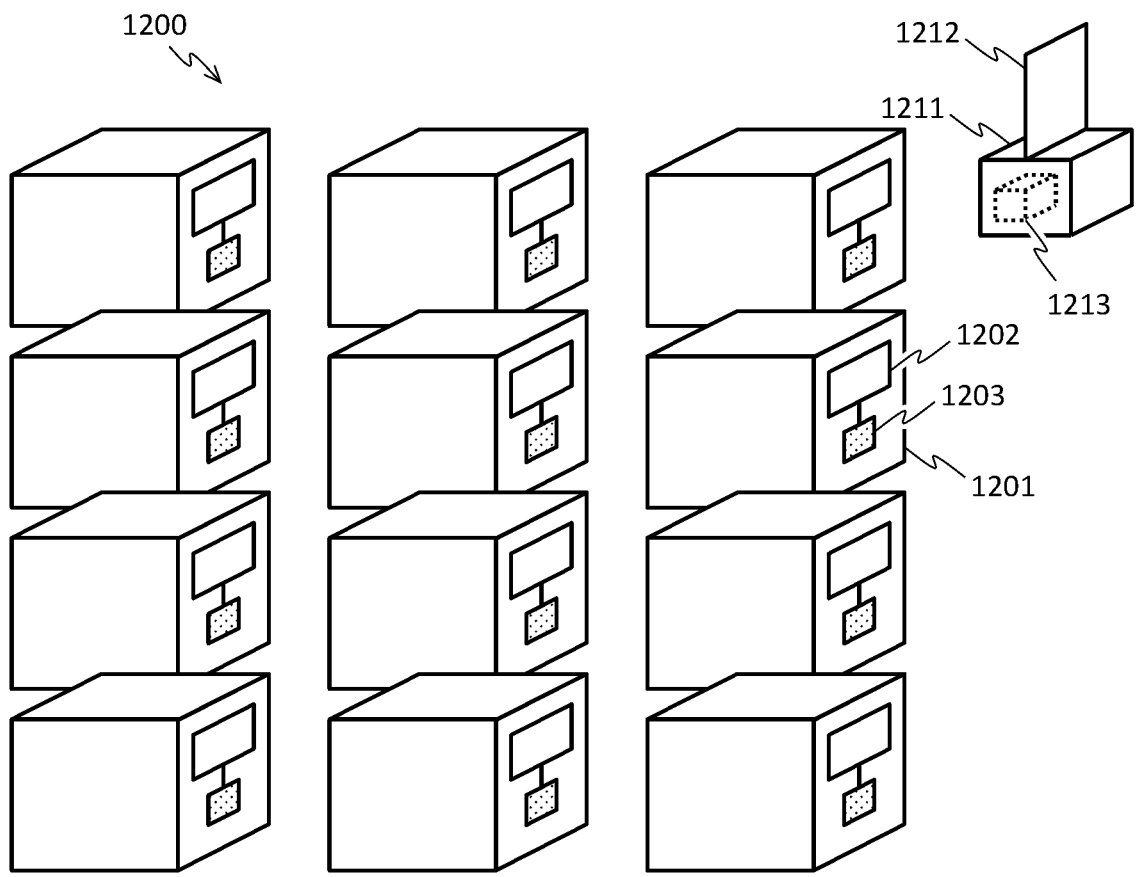
F I G. 11

RADIO COMMUNICATION SYSTEM AND RADIO MONITORING CONTROL SYSTEM

CLAIM OF PRIORITY

The present application claims priority from Japanese application JP 2017-210086 filed on Oct. 31, 2017, the content of which is hereby incorporated by reference into this application.

BACKGROUND

The present invention relates to a radio communication system and a radio monitoring control system.

Attention is being focused on a concept of Internet of Things (IoT) that collects signals related to the state of various devices via Internet and distributes signals controlling many devices based on the content of collected signals to implement highly efficient operation of various systems including many devices as components. Development of various techniques is underway toward implementation of the IoT earnestly.

To implement the IoT, a sensor which monitors information of the device and an actuator which controls operation of the device needs to be coupled with the Internet. Since a plurality of devices constituting a system include many sensors and actuators, coupling by radio communication which eliminates the need of cables as a physical coupling means is preferable from the viewpoint that restraints to the operation status of devices is solved and installation costs of the hardware related to the coupling may be reduced.

Power of the electromagnetic wave is transmitted using a polarized wave generated in a direction at the right angle to the propagation direction. Thus, when many sensors and actuators are fixedly installed on many devices, the electromagnetic wave transmitted by radio reaches an access point of the Internet in the state polarized in various directions.

On the other hand, it is difficult to increase the transmission power of the sensor and the actuator due to restraints of the power consumption in the radio circuit. Thus, deterioration of the communication quality caused by a difference between a reaching polarized wave and a polarized wave suitable for reception may become significant.

For the electromagnetic wave, Japanese Patent Application Publication No. Hei 6-311135 discloses a configuration where a receiver receives two polarization components orthogonal to synthetic waves of a plurality of electromagnetic waves simultaneously and individually using two antennas which are spatially orthogonal to each other, and synthesizes two reception signals thus obtained to maximize the reception signal intensity and thereby improve the signal to noise ratio of the reception signal.

SUMMARY OF THE INVENTION

The configuration disclosed in Japanese Patent Application Publication No. Hei 6-311135 maximizes the reception signal intensity relative to one polarized wave, but is not sufficient for the IoT where there is a possibility that electromagnetic waves reach with polarized wave in many polarization directions due to existence of many sensors and actuators.

In view of such situations, it is an object of the present invention to provide high communication quality even in an environment where two or more polarization directions are generated in the radio communication.

The present invention includes a plurality of means for solving the above problems. One example thereof includes a radio communication system communicating with the electromagnetic wave. The radio communication system includes a plurality of slave stations, each of which is configured to transmit and receive the electromagnetic wave of the fixed polarization direction, and a master station including an antenna and a base band circuit, the master station configured to identify a polarization direction of an electromagnetic wave reaching the antenna and a slave station transmitting the electromagnetic wave, and notify an identified slave station of a communication timing based on an identified polarized direction. The plurality of slave stations includes a plurality of slave stations arranged such that the electromagnetic wave transmitted from a plurality of slave stations among the plurality of slave stations reaches the antenna of the master station in a plurality of different fixed polarization directions.

An aspect of the present invention enables to provide high communication quality even in an environment where a plurality of polarization directions are generated in the radio communication.

BRIEF DESCRIPTION OF THE DRAWINGS

FIG. 1A illustrates an example of a radio system in which a plurality of fixedly installed radio terminals perform transmission to one rotational polarization radio device;

FIG. 1B illustrates an example of a transmission polarization and a reception polarization in a channel measurement mode;

FIG. 1C illustrates an example of a transmission polarization and a reception polarization in a data transmission mode;

FIG. 8 illustrates another configuration example of the radio terminal;

FIG. 11 illustrates a substation monitoring control system to which the rotational polarization radio device is applied;

DETAILED DESCRIPTION OF THE PREFERRED EMBODIMENT

Figure 2:
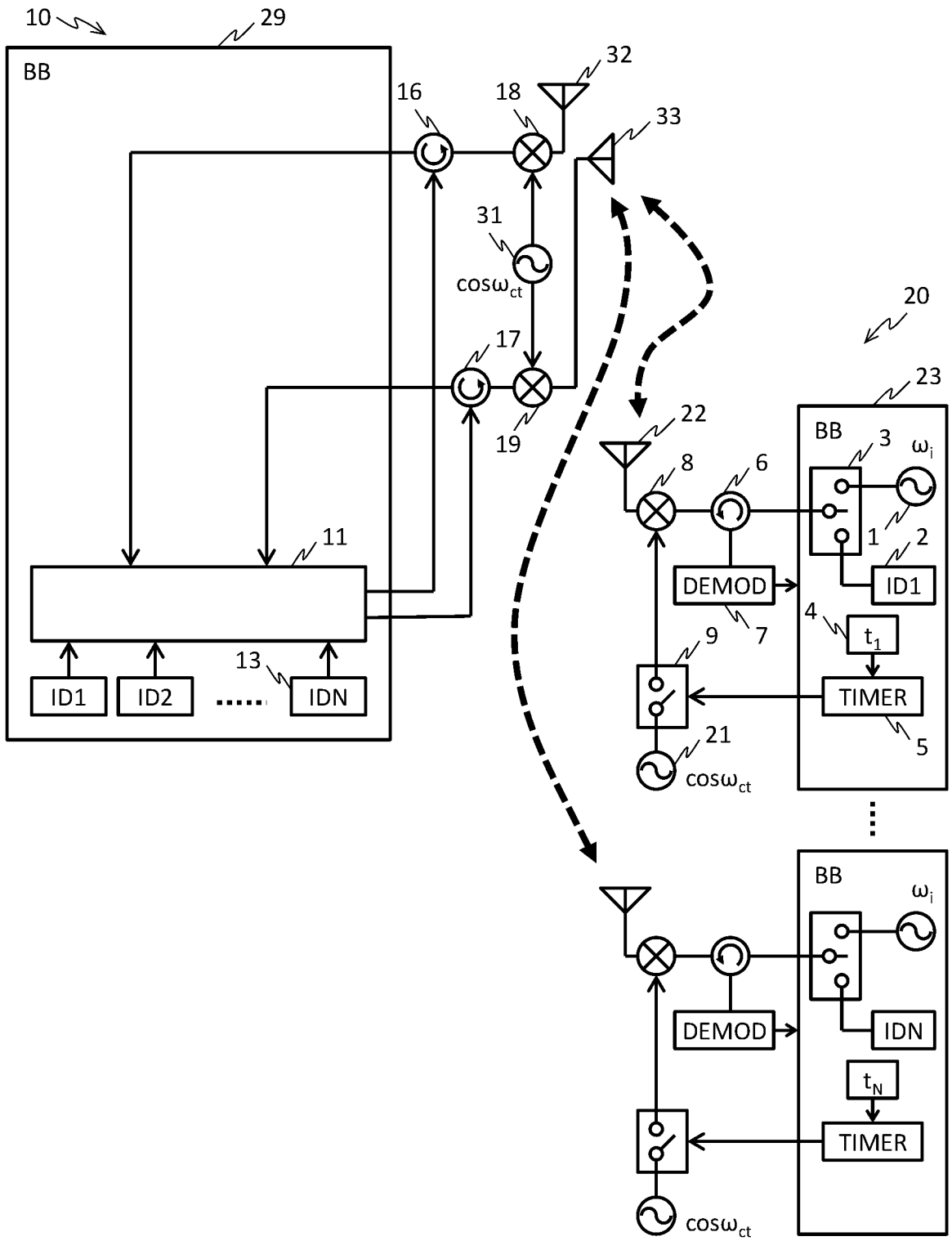
FIG. 2 illustrates a configuration example of a radio terminal and a rotational polarization radio device.

Hereinafter, embodiments of the present invention are described with reference to the accompanying drawings.

First Embodiment

In this embodiment, an operation example of a radio system in which a plurality of fixedly installed radio terminals (slave stations) and one rotational polarization radio device (master station) perform high quality communication with each other is described with reference to FIGS. 1A, 1B, 1C, 12A and 12B. FIG. 1A illustrates an example of a radio system in which a plurality of fixedly installed radio terminals 20 perform transmission to one rotational polarization radio device 10.

The rotational polarization radio device 10 includes a first antenna 32 and a second antenna 33, which are spatially orthogonal to each other to transmit and receive the rotational polarization. The rotational polarization radio device 10 is coupled with a network (not shown). Each of the plurality of radio terminals 20 includes one fixed polarization antenna 102, has a name 103, and is coupled with, for example, a sensor and an actuator (not shown).

The name 103 of each of the plurality of radio terminals 20 is ai, bi, ci, and di (i is an integer larger than 1) respectively. The name 103 is described further in detail later. In the example of FIG. 1A, a radio terminal 20 with the name 103 of cl is described by assigning relevant reference numerals, although configurations of radio terminals with other names are the same. However, the direction of radio terminals to be fixedly installed is not the same.

In the example of the radio terminal 20, the fixed polarization antenna 102 is fixed to the radio terminal 20. Thus, arrow of the fixed polarization antenna 102 represents direction of the radio terminal 20. The arrow of the fixed polarization antenna 102 further represents the polarization direction.

Figure 12A:
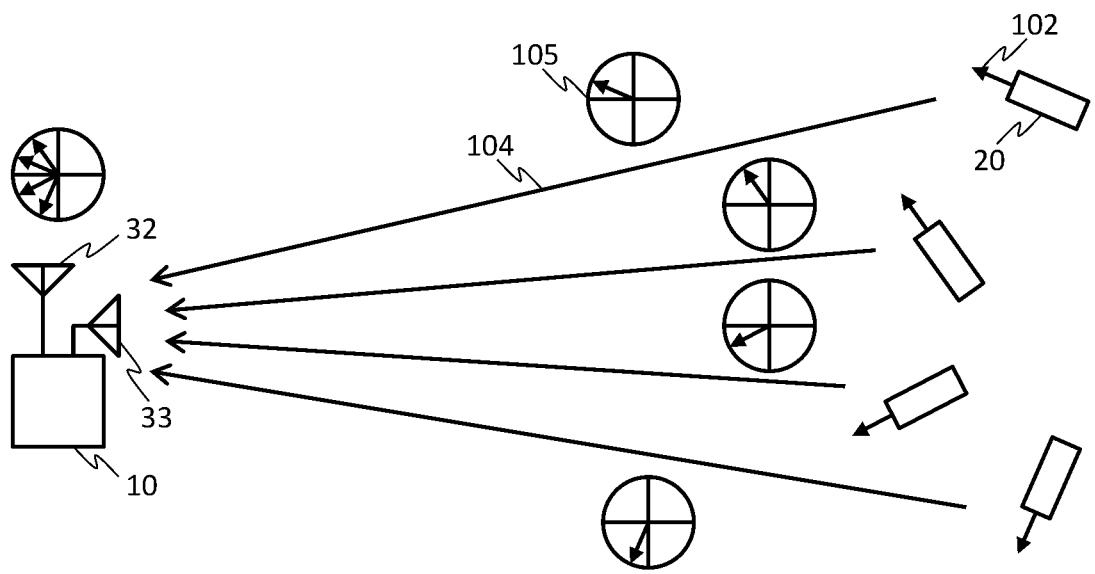
FIG. 12A illustrates an example of a case where there is no obstacles between a rotational polarization radio device and a radio terminal.
Figure 12B:
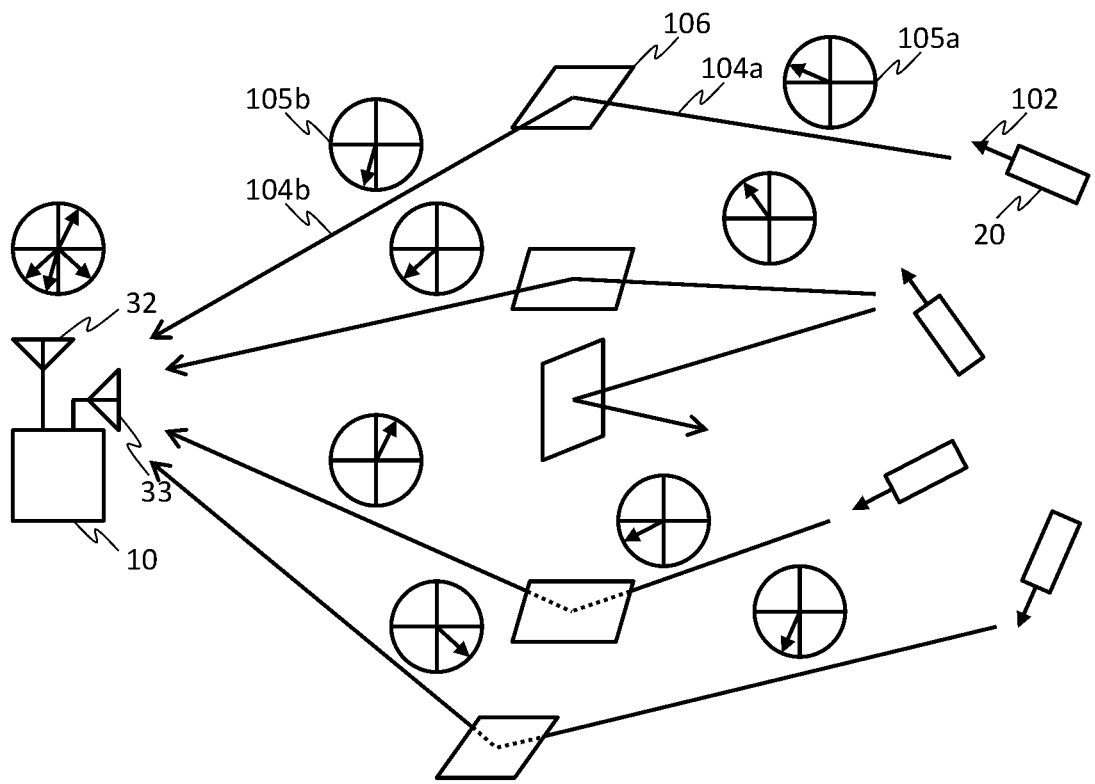
FIG. 12B illustrates an example of a case where there are obstacles between a rotational polarization radio device and a radio terminal.

The following describes the state of the polarized wave 105 in which electromagnetic waves 104 transmitted by a plurality of radio terminals 20 reach the rotational polarization radio device 10 with reference to FIGS. 12A and 12B. FIG. 12A illustrates an example of a case where there is no obstacle acting as electromagnetic wave scattering substances between the rotational polarization radio device 10 and radio terminals 20.

As described above, the arrow direction of the fixed polarization antenna 102 of the radio terminal 20 indicates the polarization direction. As illustrated in FIG. 12A, the electromagnetic wave 104 from the radio terminal 20 reaches the rotational polarization radio device 10 with the polarized wave 105 which is the same as the wave transmitted by the radio terminal 20.

Then, since the electromagnetic wave 104 is a vector wave, each of electromagnetic waves 104 reaching one rotational polarization radio device 10 from a plurality of radio terminals 20 is synthesized vectorially, and the rotational polarization radio device 10 receives the electromagnetic wave 104 as a vector wave having one polarization direction.

FIG. 12B illustrates an example of a case where there are obstacles 106 acting as electromagnetic wave scattering substances between the rotational polarization radio device 10 and the radio terminal 20. The electromagnetic waves 104a transmitted from a plurality of radio terminals 20 are reflected by the obstacles 106. Then, a shift occurs in a polarization direction uniquely determined by a normal vector of the reflection surface and an incident vector of the electromagnetic wave 104a.

For example, the electromagnetic wave 104a with the polarization 105a transmitted by the radio terminal 20 reaches the rotational polarization radio device 10 as an electromagnetic wave 104b with a polarization 105b. For this reason, depending on existence or non-existence of the obstacle 106 between the rotational polarization radio device 10 and the radio terminal 20, the polarization 105 of the electromagnetic wave 104 and the polarization 105b of the electromagnetic wave 104b reaching the rotational polarization radio device 10 are different from each other, and the polarization directions received by the rotational polarization radio device 10 are also different from each other.

In other words, even when the transmitting polarization direction is fixed by fixedly installing the rotational polarization radio device 10 and a plurality of radio terminals 20, a change in the arrangement of surrounding electromagnetic wave scattering substances also changes the polarization direction received by the rotational polarization radio device 10.

The radio system according to this embodiment has two modes of a channel measurement mode for grouping the plurality of radio terminals 20 and a data transmission mode for performing data transmission. Referring back to FIG. 1A, the rotational polarization radio device 10 divides a cycle 101 of the rotational polarization into four parts, a, b, c, and d.

The example of FIG. 1A shows that a radio terminal 20 with the name 103 of ai belongs to a group of a divided area a; a radio terminal 20 with the name 103 of bi belongs to a group of a divided area b; a radio terminal 20 with the name 103 of ci belongs to a group of a divided area ci; and a radio terminal 20 with the name 103 of di belongs to a group of a divided area d.

Each of the plurality of radio terminals 20 continuously transmits a signal including the ID (identifier: any one of ID1 to IDN) at a timing different from other radio terminals over one cycle of the rotational polarization of the rotational polarization radio device 10. As being transmitted at different timings, electromagnetic waves transmitted from each radio terminal 20 are not vectorially synthesized and have a polarization direction different from each other like the cycle 101 of FIG. 1A.

FIG. 1B illustrates an example of a transmission polarization and a reception polarization in a channel measurement mode. In the channel measurement mode, the rotational polarization radio device 10 measures a signal transmitted from one radio terminal 20 within one cycle of the rotational polarization, identifies a timing (polarization direction) indicating a maximum reception signal intensity within one cycle, and associates the divided area of the rotational polarization and the ID of the plurality of radio terminals with each other.

In the example of FIG. 1B, solid line arrow indicates the transmission polarization, and broken line arrow indicates the reception polarization. The radio terminal 20 with the name 103 of a2 continuously transmits eight times over one cycle of the rotational polarization. The rotational polarization radio device 10 receives the polarized wave after changing eight times. When the rotational polarization radio device 10 changes the polarization to a fourth polarization or a polarization within the divided area a of the cycle 101 of FIG. 1A, the transmission polarization and the reception polarization are brought closer to each other and thereby the reception signal intensity is maximized.

In a next one cycle, the radio terminal 20 with the name 103 of b1 continuously transmits eight times over one cycle, and the rotational polarization radio device 10 receives the polarized wave after changing eight times. In a further next one cycle, the radio terminal 20 with the name 103 of c4 continuously transmits eight times over one cycle, and the rotational polarization radio device 10 receives the polarized wave after changing eight times. Rotation frequency of the rotational polarization is preferably a frequency lower than the carrier wave frequency of the transmitted and received electromagnetic waves.

After associating a radio terminal 20 to be a predetermined communication target and the ID and the divided area of the rotational polarization with each other using the channel measurement mode, the rotational polarization radio device 10 determines a radio terminal 20 which transmits into each time area of the rotational polarization. Here, each time area corresponds to any one of four divided areas of the rotational polarization.

When a plurality of radio terminals 20 correspond to one time area, the rotational polarization radio device 10 assigns the transmission timing such that the plurality of radio terminals 20 transmit at a time of a different cycle of the rotational polarization and at a time of the same divided area of the rotational polarization in order to avoid the plurality of radio terminals 20 transmitting at the same time. In the example of FIG. 1A, six radio terminals 20 with the name 103 of ai (i=1 to 6) are diverged into six different cycles.

Information of the transmission timing may be the information representing a time indicating a cycle to which it belongs and a time within one cycle. The rotational polarization radio device 10 transmits information of the transmission timing to each of radio terminals 20. After having transmitted information of the transmission timing, the rotational polarization radio device 10 ends the channel measurement mode and shifts to the data transmission mode.

As illustrated in FIG. 1A, the divided area a, for example, includes two angle ranges in the cycle 101. Thus, there are two time areas within one cycle. When a plurality of radio terminals 20 correspond to one time area, the rotational polarization radio device 10 may assign the transmission timing such that the plurality of radio terminals 20 transmit at a time of a different half cycle of the rotational polarization and at a time of the same divided area of the rotational polarization.

FIG. 1C illustrates an example of a transmission polarization and a reception polarization in the data transmission mode. In the data transmission mode, a plurality of radio terminals 20 transmit data to the rotational polarization radio device 10 in accordance with a transmission timing transmitted earlier.

In the example of FIG. 1C, solid line arrow indicates the transmission polarization, and broken line arrow indicates the reception polarization. A radio terminal 20 with the name 103 of c4 transmits into a time area (transmission timing) where the reception polarization of the rotational polarization radio device 10 corresponds to the divided area c of rotational polarization. Thereafter, transmission of each of radio terminals 20 with the name 103 of dj, ak, bl, and cm is repeated every half cycle.

According to this embodiment, the rotational polarization radio device 10 and one radio terminal 20 perform one-to-one radio communication at the same time. Thus, deterioration of the communication quality caused by interference of signals transmitted by other radio terminals can be prevented. Also, since the reception polarization direction of the rotational polarization radio device 10 and the transmission polarization direction of the radio terminal 20 are close to each other, the reception signal intensity of the rotational polarization radio device 10 can be enhanced.

Further, since the transmission timing of each radio terminal is assigned in the channel measurement mode preceding the data transmission mode, even when there is a change in the arrangement of electromagnetic wave scattering substances around the rotational polarization radio device 10 and a plurality of radio terminals 20, a transmission timing corresponding to the changed arrangement can be assigned. Thus, the embodiment allows for improvement of the communication quality in the radio communication.

Second Embodiment

In this embodiment, a configuration example of a plurality of fixedly installed radio terminals 20 and one rotational polarization radio device 10 is described. FIG. 2 illustrates a configuration example of a radio terminal and a rotational polarization radio device 10. The radio terminal 20 includes an information signal generator 1 and an ID generator 2, both of which are selected by a change-over switch 3 to couple with a first terminal of a terminal circulator 6.

The information signal generator 1, the ID generator 2, and the change-over switch 3 are incorporated into a terminal base band circuit 23. A second terminal of the terminal circulator 6 is coupled with a terminal antenna 22 via a terminal mixer 8. A third terminal of the terminal circulator 6 is coupled with a demodulator 7, and output of the demodulator 7 is inputted into the terminal base band circuit 23.

A local input terminal of the terminal mixer 8 is coupled with a terminal carrier wave frequency generator 21 via a switch 9, and the switch 9 is controlled by a timer 5 which is coupled with a transmission time generator 4 incorporated into the terminal base band circuit 23.

The rotational polarization radio device 10 includes a first antenna 32 and a second antenna 33, which are spatially orthogonal to each other (polarized waves of electromagnetic waves transmitted and received by respective antennas are orthogonal to each other). The first antenna 32 is coupled with a third terminal of a first circulator 16 via a first mixer 18, and the second antenna 33 is coupled with a third terminal of a second circulator 17 via a second mixer 19.

Local inputs of the first mixer 18 and the second mixer 19 receive output of a carrier wave generator circuit 31. Outputs of first terminals of the first circulator 16 and the second circulator 17 are respectively inputted into a central processing unit (CPU) 11 incorporated into the base band circuit 29.

The CPU 11 is coupled with an ID generation circuit 13 configured to output the ID of the radio terminal 20. The CPU 11 compares demodulation result of an input signal from each of the circulators and output of the ID generation circuit 13 with each other, associates a specific ID and the reception polarization of the rotational polarization radio device 10 with each other, outputs a signal including information of the associated ID and the transmission timing of data transmission, and inputs as an orthogonal signal to second terminals of the first circulator 16 and the second circulator 17.

In the channel measurement mode, each of a plurality of radio terminals 20 causes the ID generator 2 to generate the ID thereof and inputs into a terminal mixer 8 via the change-over switch 3 and the terminal circulator 6. An output of the terminal carrier wave frequency generator 21 is supplied to the terminal mixer 8 via the switch 9. A signal including the ID is up-converted into a carrier wave frequency band and radiated by a terminal antenna 22 to a space as the electromagnetic wave.

The rotational polarization radio device 10 receives electromagnetic waves from radio terminals 20 through the first antenna 32 and the second antenna 33. Signals received by each of the antennas are down-converted by the first mixer 18 and the second mixer 19 using output of the carrier wave generation circuit 31 as an output signal, and inputted respectively into the base band circuit 29 via the first circulator 16 and the second circulator 17.

Each input signal intensity of the base band circuit 29 becomes a signal intensity received at a different time and with a different reception polarization corresponding to a different polarization angle. Thus, a time when the input signal intensity becomes maximum within one cycle of the rotational polarization indicates the polarization direction in which the electromagnetic wave transmitted by the transmitting radio terminal 20 reaches the rotational polarization radio device 10, and demodulation result of each input signal becomes the ID of the transmitting radio terminal 20.

Determination of the maximum value of respective input signal intensities of the base band circuit 29 and signal demodulation are carried out by a digital signal processing of the CPU 11. Then, after demodulating the ID of the radio terminal 20 specified by the ID generation circuit 13, the CPU 11 determines the transmission timing of respective radio terminals 20 in the data transmission mode from the reaching polarization of the electromagnetic wave transmitted from respective radio terminals 20.

The CPU 11 outputs a signal for transmitting information of the obtained ID and the transmission timing in an orthogonal format and inputs into the first mixer 18 via the first circulator 16 and into the second mixer 19 via the second circulator 17. Then, the signal is up-converted into the carrier wave frequency band by the first mixer 18 and the second mixer 19 and radiated to a space as the electromagnetic wave of the rotational polarization from the first antenna 32 and the second antenna 33.

After transmitting the ID, respective radio terminals 20 receive the incoming electromagnetic wave from the terminal antenna 22, down-convert in the terminal mixer 8, and cause the demodulator 7 to input the demodulation result into the terminal base band circuit 23 via the terminal circulator 6. The electromagnetic wave may not be converted by the terminal mixer 8, and instead, may be converted by the demodulator.

The terminal base band circuit 23 compares the demodulation result and the ID thereof with each other. When the demodulation result matches the ID thereof, the terminal base band circuit 23 causes the transmission time generator 4 to store information of the transmission timing included in the demodulation result and causes the change-over switch 3 to interlock output of the information signal generator 1 with the timer 5 and the switch 9. Then, the terminal base band circuit 23 shifts to the data transmission mode.

After transmitting the information of the ID and the transmission timing obtained in the ID generation circuit 13, the rotational polarization radio device 10 shifts to the data transmission mode. Operation of the rotational polarization radio device 10 which has shifted to the data transmission mode is the same as the operation of the channel measurement mode except that the CPU 11 handles the inputted signal as data transmitted by respective radio terminals 20.

In the channel measurement mode, the ID generated by the ID generator 2 of respective radio terminals 20 is preferably an ID different from an ID generated by the ID generator 2 of the other radio terminals 20. The timing at which output of the terminal carrier wave frequency generator 21 is supplied by the timer 5 of respective radio terminals via the switch 9 for transmitting the ID is also preferably one cycle different from the timing of the other radio terminals 20.

According to this embodiment, the rotational polarization radio device 10 and one radio terminal 20 perform one-to-one radio communication at the same time. Thus, deterioration of the communication quality caused by interference of signals transmitted by other radio terminals can be prevented. Further, smooth change-over between the channel measurement mode and the data transmission mode allows for suppressing the drop of the data transmission rate caused by interruption of the channel measurement mode.

Third Embodiment

Figure 3:
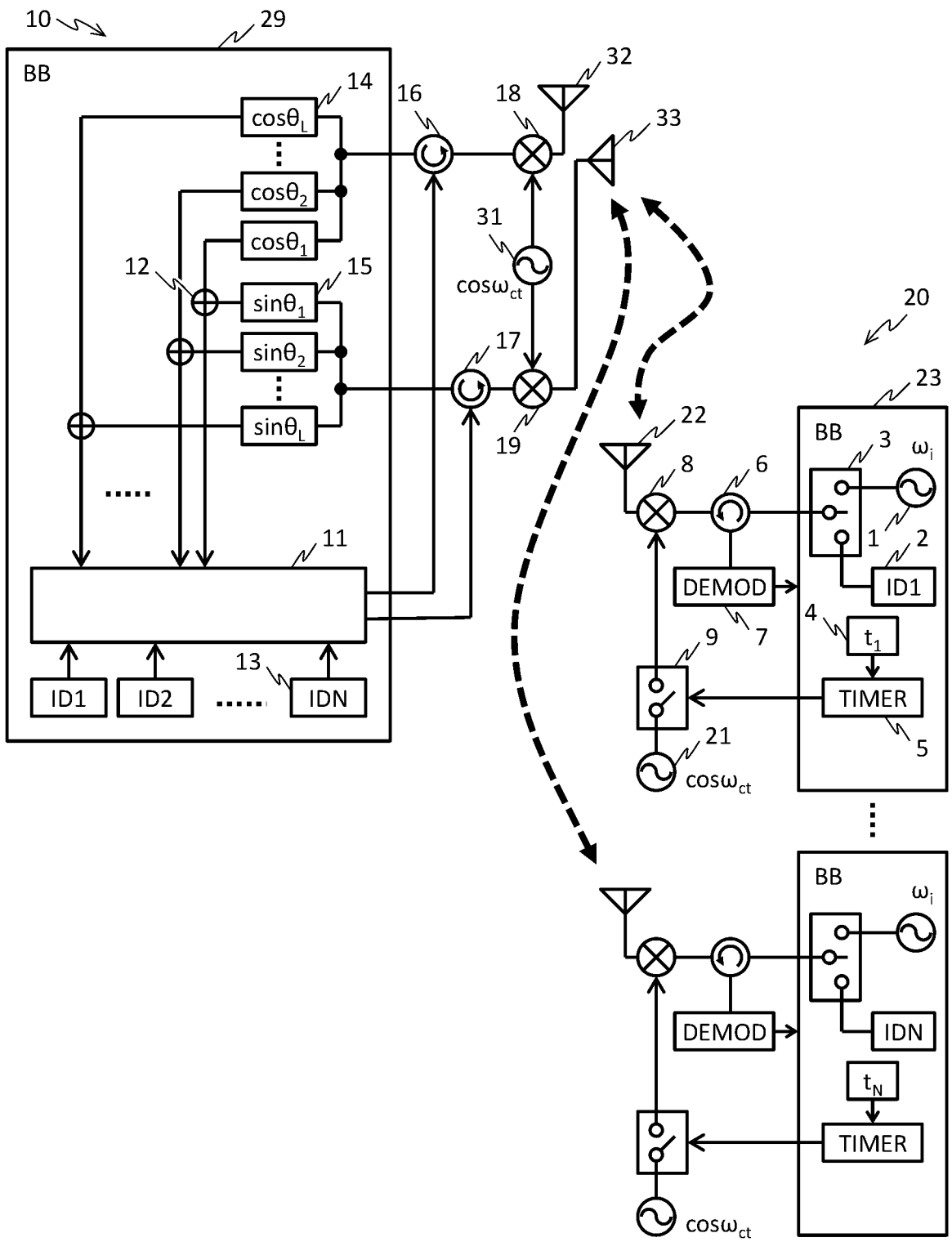
FIG. 3 illustrates another configuration example of the rotational polarization radio device.

In this embodiment, another configuration example of a plurality of fixedly installed radio terminals 20 and one rotational polarization radio device 10 is described. FIG. 3 illustrates a configuration example of a radio terminal and a rotational polarization radio device 10. Radio terminals 20 illustrated in FIG. 3 are the same as radio terminals 20 illustrated in FIG. 2. Description of components of the rotational polarization radio device 10 illustrated in FIG. 3 same as those of the rotational polarization radio device 10 illustrated in FIG. 2 is omitted by assigning same reference numerals.

The configuration of the rotational polarization radio device 10 in illustrated in FIG. 3 is different from the configuration illustrated in FIG. 2 in that outputs of first terminals of the first circulator 16 and the second circulator 17 are respectively branched and inputted into a plurality of cosine weight circuits 14 and a plurality of sine weight circuits 15 incorporated into the base band circuit 29, and outputs of a plurality of cosine weight circuits 14 and a plurality of sine weight circuits having the same polarization angle are respectively added and inputted into the CPU 11 by a plurality of synthesizers 12.

The CPU 11 determines a maximum value among a plurality of input signals from a plurality of synthesizers 12, and determines whether the maximum input signal is output of any synthesizer 12 or output of a cosine weight circuit 14 and a sine weight circuit 15 having any polarization angle.

The number of each of cosine weight circuits 14 and sine weight circuits 15 may be the number of divided areas of the cycle 101, and the polarization angle of each of the cosine weight circuit 14 and the sine weight circuit 15 may correspond to each divided area. When the number of each of cosine weight circuits 14 and sine weight circuits 15 is eight, in the channel measurement mode, one radio terminal 20 may transmit once instead of transmitting eight times, as illustrated in FIG. 1B.

The number of cosine weight circuits 14 and the number of sine weight circuits 15 may be smaller than the number of divided areas of the cycle 101. When the number is smaller than the number of divided areas, one radio terminal 20 may continuously transmit two times or more or seven times or less by rotating the reception polarization by the smaller number.

The CPU 11 is coupled with the ID generation circuit 13 configured to output the ID of the radio terminal 20. The CPU 11 compares a plurality of demodulation results of outputs of a plurality of synthesizers 12 which are reception signals received with a plurality of polarized waves at the same time, and output of the ID generation circuit 13 with each other, and associates a specific ID and the reception polarization of the rotational polarization radio device 10 with each other.

An aspect of the embodiment associates the reception polarization and the ID with each other with respect to a plurality of radio terminals 20 at a time of one cycle of the rotational polarization according to the first embodiment. Thus, the embodiment may reduce implementation time of the channel measurement mode compared with the second embodiment, and allow for improvement of the throughput at all times of the radio system or a time including the channel measurement time and the data transmission time.

Fourth Embodiment

Figure 4:
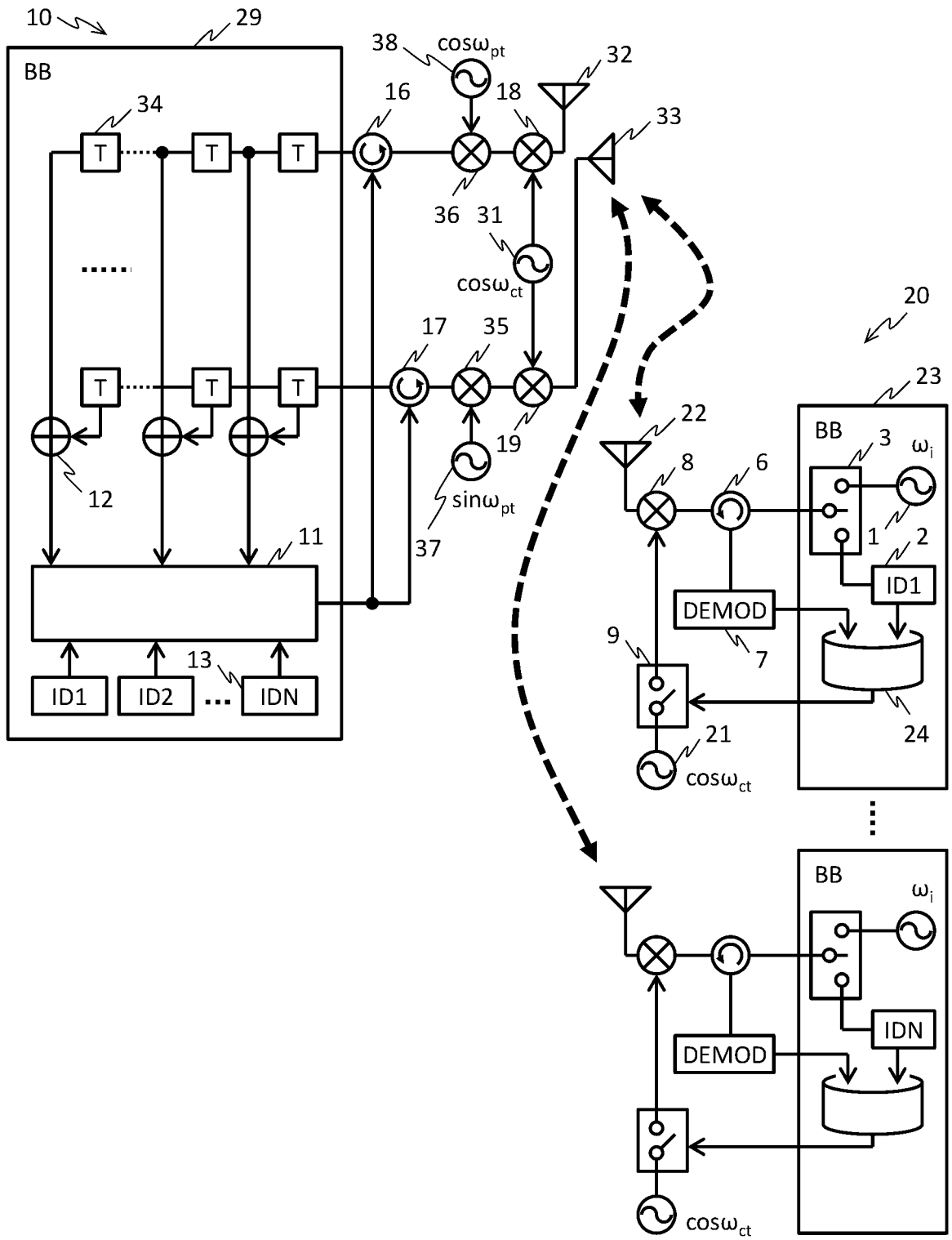
FIG. 4 illustrates another configuration example of the radio terminal and the rotational polarization radio device.

In this embodiment, another configuration example of a plurality of fixedly installed radio terminals 20 and one rotational polarization radio device 10 is described. FIG. 4 illustrates a configuration example of a radio terminal 20 and a rotational polarization radio device 10. Description of components same as those of the radio terminal 20 and the rotational polarization radio device 10 illustrated in FIG. 2 is omitted by assigning same reference numerals.

This embodiment is different from the first and third embodiments in the transmission configuration of the slave terminal 20 and the configuration of processing signals which are the maximum value determination target of the rotational polarization radio device 10. First, for the transmission configuration of the radio terminal 20, a comparator 24 compares an output of the demodulator 7 and an output of the ID generator 2 with each other in the radio terminal 20, and the switch 9 is controlled according to the comparison result.

An output of the ID generator 2 to the comparator 24 is the ID, which is the same as output of the ID generator 2 to the change-over switch 3. On the other hand, when communicating with a specific radio terminal 20 using a specific polarized wave at a time different from that of other radio terminal 20, the rotational polarization radio device 10 transmits the ID of the specific radio terminal 20. Thus, the rotational polarization radio device 10 may select the specific radio terminal 20 with which the rotational polarization radio device 10 communicates.

Next, for the configuration of processing signals which are maximum value determination targets of the rotational polarization radio device 10, a third mixer 36 is inserted between the first mixer 18 and the second mixer 19 and a fourth mixer 35 between the first circulator 16 and the second circulator 17, and outputs of the rotational polarization frequency cosine generation circuit 38 and the rotational polarization frequency sine generation circuit 37 are supplied to the third mixer and the fourth mixer respectively as a local signal.

Then, signals outputted from each of first terminals of the first circulator 16 and the second circulator 17 are delayed via the vertical connection of a plurality of delay circuits 34, and signals having the same delay amount are sequentially synthesized in a plurality of synthesizers 12 and inputted into the CPU 11 incorporated into the base band circuit 29.

Each of delay circuits 34 in the vertical connection outputs the same signal to a delay circuit 34 and a synthesizer 12 of the next stage. The CPU 11 determines a maximum value among signals inputted from a plurality of synthesizers 12, and determines which synthesizer 12 outputs the input signal corresponding to the maximum value.

The number of vertically connected delay circuits 34 may be the number of divided areas. The cycle of the rotational polarization frequency cosine generation circuit 38 and the rotational polarization frequency sine generation circuit 37 may be a time when one radio terminal 20 illustrated in FIG. 1B transmits once. The delay time of one delay circuit 34 may be a value obtained by dividing the cycle of the rotational polarization frequency cosine generation circuit 38 and the cycle of the rotational polarization frequency sine generation circuit 37 by the number of divided areas.

The radio terminal 20 may obtain the electromotive force by receiving the electromagnetic wave and supply as the power thereof. For this purpose, a power supply circuit may be provided between the third terminal of the terminal circulator 6 and the demodulator 7. Further, power consumption of the radio terminal 27 may be suppressed by reducing the number of bits of the ID generator 2 and the comparator 24, and the number of ID generators 13 also may be the same as the number of the bits.

An aspect of this embodiment allows for simplification of the configuration of the radio terminal 20. Also, an aspect of this embodiment allows implementation of the operation same as the operation of the third embodiment by digital calculation in the base band circuit 29. This allows for downsizing and cost reduction of devices, although signal processing amount of the rotational polarization radio device 10 increases.

Fifth Embodiment

Figure 5A:
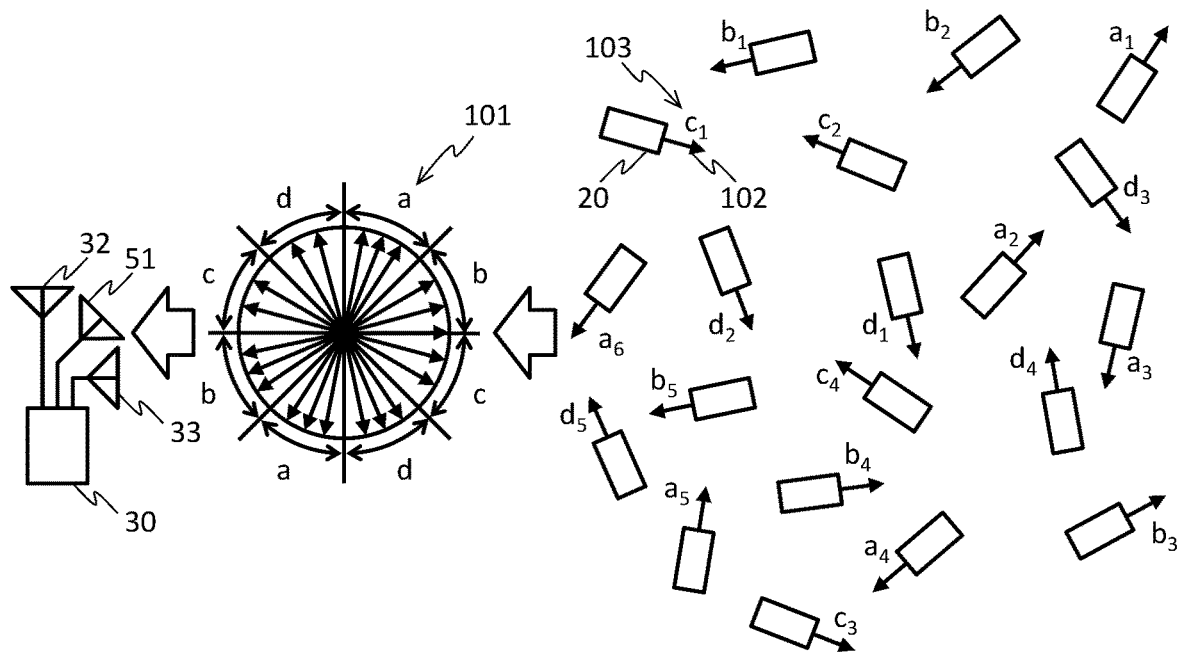
FIG. 5A illustrates another example of a radio system in which a plurality of fixedly installed radio terminals perform transmission to one rotational polarization radio device.

In this embodiment, an operation example of a radio system in which a plurality of fixedly installed radio terminals and one rotational polarization radio device perform high quality communication with each other is described with reference to FIGS. 5A, 5B, and 5C. FIG. 5A illustrates an example of a radio system in which a plurality of fixedly installed radio terminals 20 perform transmission to one rotational polarization radio device 30. Description of components same as those illustrated in FIG. 1A is omitted by assigning same reference numerals. The cycle 101 of the radio terminal 20 is the same as the First Embodiment.

The rotational polarization radio device 30 is coupled with a network (not shown). The rotational polarization radio device 30 includes total three antennas of a first antenna 32, a second antenna 33, and a third antenna 51 which is spatially orthogonal to both of the first antenna 32 and the second antenna 33.

The radio system according to this embodiment also has two modes of a channel measurement mode for grouping the plurality of radio terminals 20 and a data transmission mode for performing data transmission. In this embodiment, the rotational polarization radio device 30 also divides the cycle 101 of the rotational polarization into four parts, a, b, c, and d. Each of the plurality of radio terminals 20 continuously transmits a signal including the ID at a timing different from other radio terminals 20 over one cycle of the rotational polarization of the rotational polarization radio device 30.

Figure 5B:
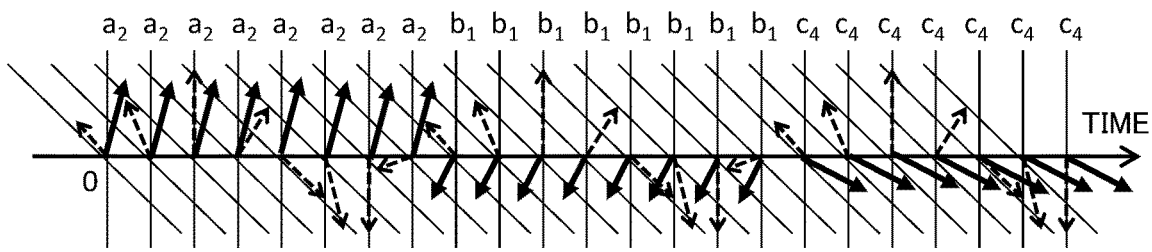
FIG. 5B illustrates an example of a transmission polarization and a reception polarization in a channel measurement mode.

FIG. 5B illustrates an example of a transmission polarization and a reception polarization in the channel measurement mode. The solid line arrow indicates the transmission polarization, and the broken line arrow indicates the reception polarization. As illustrated in FIG. 5B, in the channel measurement mode, the rotational polarization radio device 30 measures signals transmitted from individual radio terminals 20 with a different polarization within one cycle of the rotational polarization, and identifies a timing (polarization direction) indicating a maximum reception signal intensity within one cycle.

Thus, the rotational polarization radio device 30 associates the divided area of the rotational polarization and the ID of a plurality of radio terminals 20 with each other, and at the same timing, measures three complex signal intensities with the reception polarization as the rotational polarization using pairs of two different antennas among three antennas (total three pairs) of the rotational polarization radio device 30.

After associating a radio terminal 20 to be a predetermined communication target and the ID and the divided area of the rotational polarization with each other using the channel measurement mode, the rotational polarization radio device 30 determines a radio terminal 20 which transmits into each time area of the rotational polarization. In this operation, the rotational polarization radio device 30 assigns at most three radio terminals 20 to one time area.

When three or more radio terminals 20 correspond to one time area, the rotational polarization radio device 30 assigns the transmission timing such that the plurality of radio terminals 20 transmit at a time of a different cycle of the rotational polarization and at a time of the same divided area of the rotational polarization in order to avoid three or more radio terminals 20 transmitting at the same time.

The rotational polarization radio device 30 transmits information of the assigned transmission timing to each of radio terminals 20. After having transmitted information of the transmission timing, the rotational polarization radio device 30 ends the channel measurement mode and shifts to the data transmission mode.

Figure 5C:
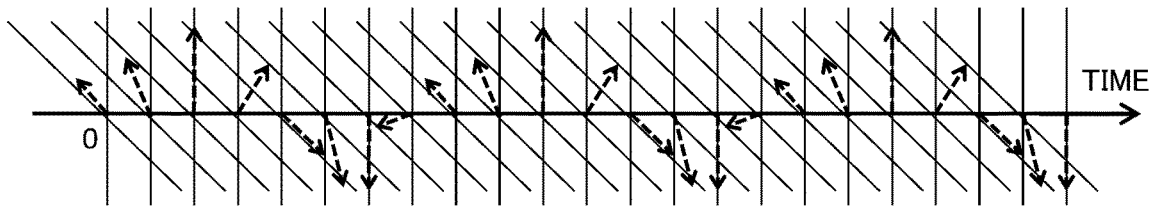
FIG. 5C illustrates an example of a transmission polarization and a reception polarization in a data transmission mode.

FIG. 5C illustrates an example of a transmission polarization and a reception polarization in the data transmission mode. In the data transmission mode, a plurality of radio terminals 20 transmit data to the rotational polarization radio device 30 in accordance with a transmission timing transmitted earlier. In FIG. 5C, to avoid complexity and difficulty of viewing, broken line arrow represents the reception polarization, and the transmission polarization is not shown.

The rotational polarization radio device 30 reconfigures each of signals transmitted toward the rotational polarization radio device 30 from at most three radio terminals 20 at the same time (same time area and same transmission timing) using three complexity signal intensities measured in divided areas corresponding to time areas (transmission timings) and three reception signals received as the rotational polarization from two pairs of antennas among three antennas.

In the example of FIG. 5C, three radio terminals 20 with the name 103 of c2, c3, and c4 transmit into time areas (transmission timings) where the reception polarization of the rotational polarization radio device 30 corresponds to the divided area c of rotational polarization, and the rotational polarization radio device 30 reconfigures each of signals transmitted from the three radio terminals 20.

According to this embodiment, the rotational polarization radio device 30 and at most three radio terminals 20 in the same divided area perform radio communication. Thus, deterioration of the communication quality caused by interference of signals transmitted by other radio terminals 20 may be prevented. Also, transmission by a plurality of radio terminals 20 at the same time allows for improvement of the throughput of the radio system.

The cycle 101 of the rotational polarization may be a three-dimensional sphere, and the three-dimensional sphere may be divided as divided areas. Then, in the channel measurement mode, the rotational polarization radio device 30 may identify a divided area where the reception signal intensity is maximum among divided areas formed by dividing the three-dimensional sphere and transmit to one radio terminal 20 so as to transmit at one transmission timing corresponding to the identified divided area.

Thus, in the same manner as the first embodiment, one radio terminal 20 transmits at one transmission timing. This prevents deterioration of the communication quality caused by interference of signals transmitted by other radio terminals 20 in the same manner as the first embodiment, although the effect of improving of the throughput cannot be expected.

In addition to this, since electromagnetic waves reaching the rotational polarization radio device 30 do not always vertically reach a surface formed by two antennas, i.e. the first antenna 32 and the second antenna 33, adding the third antenna 51 brings the reception polarization direction of the rotational polarization radio device 10 and the transmission polarization direction of the radio terminal 20 closer to each other than in the first embodiment. Thus, the effect of increasing the reception signal intensity of the rotational polarization radio device 10 may be expected.

Sixth Embodiment

Figure 6:
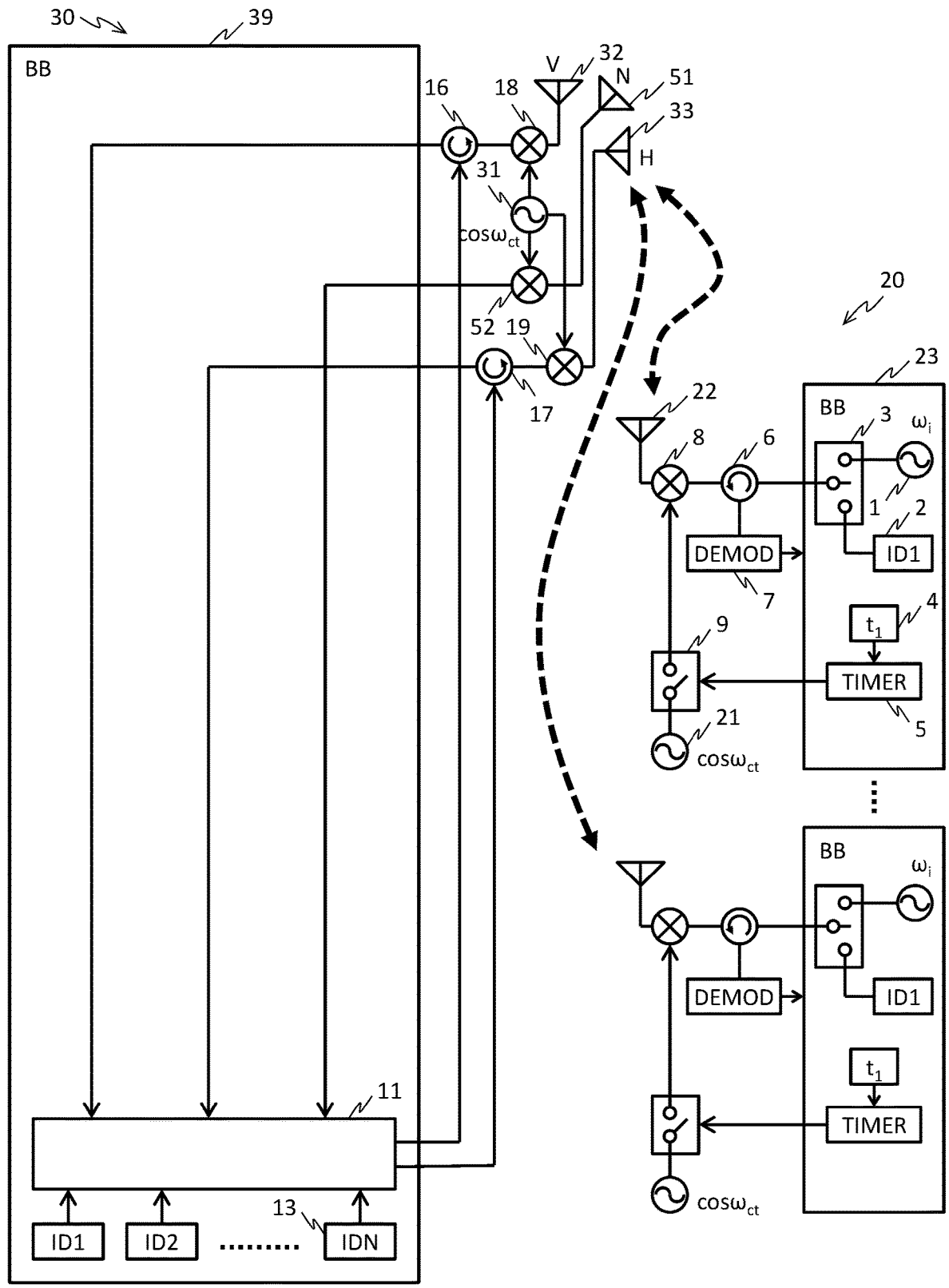
FIG. 6 illustrates another configuration example of the rotational polarization radio device.

In this embodiment, another configuration example of a plurality of fixedly installed radio terminals 20 and one rotational polarization radio device 30 is described. FIG. 6 illustrates a configuration example of a radio terminal 20 and a rotational polarization radio device 30. Radio terminals 20 illustrated in FIG. 6 are the same as radio terminals 20 illustrated in FIG. 2. Description of components of the rotational polarization radio device 30 illustrated in FIG. 6, which are the same as those of the rotational polarization radio device 10 illustrated in FIG. 2 is omitted by assigning the same reference numerals.

The rotational polarization radio device 30 includes a first antenna 32, a second antenna 33, and a third antenna 51, which are spatially orthogonal to each other. The first antenna 32 is coupled with a first circulator 16 via a first mixer 18 and the second antenna 33 is coupled with a third terminal of a second circulator 17 via a second mixer 19.

Outputs of first terminals of the first circulator 16 and the second circulator 17 are respectively inputted into a central processing unit (CPU) 11 incorporated into the base band circuit 39. The third antenna 51 inputs into the CPU 11 incorporated into the base band circuit 39 via a fifth mixer 52. Local inputs of the first mixer 18, the second mixer 19, and the fifth mixer 52 receive an output of a carrier wave generator circuit 31.

The CPU 11 is coupled with the ID generation circuit 13 configured to output the ID of the radio terminal 20. Reception signals received with a plurality of polarized waves pass through the first circulator 16, the second circulator 17, and the fifth mixer 52. Then, the CPU 11 compares the demodulation result of signals inputted thereto and output of the ID generation circuit 13 with each other, and associates a specific ID and the reception polarization of the rotational polarization radio device 30 with each other.

In this operation, the CPU 11 stores total three complex reception signal intensities received as the rotational polarization by two different pairs of antennas among three antennas (which are obtained respectively via the first circulator 16, the second circulator 17, and the fifth mixer 52).

The CPU 11 outputs a signal including information of the ID and data transmission timing to a radio terminal having the associated ID and inputs as an orthogonal signal into the first circulator 16 and the second circulator 17.

In the channel measurement mode, each of a plurality of radio terminals 20 causes the ID generator 2 to generate the ID thereof and inputs into a terminal mixer 8 via the change-over switch 3 and the terminal circulator 6. An output of the terminal carrier wave frequency generator 21 is supplied to the terminal mixer 8 via the switch 9. A signal including the ID is up-converted into a carrier wave frequency band and radiated by a terminal antenna 22 to a space as the electromagnetic wave.

The rotational polarization radio device 30 receives electromagnetic waves transmitted from radio terminals 20 through the first antenna 32, the second antenna 33, and the third antenna 51. Signals received through each of the antennas are down-converted by the first mixer 18, the second mixer 19, and the third mixer 52 using an output of the carrier wave generation circuit 31 as a local signal, or are inputted into the CPU 11 of the base band circuit 29 directly or via the first circulator 16 and the second circulator 17.

There are three types of two input pairs among three inputs of the CPU 11, and a signal obtained by two input pairs is a signal received using the rotational polarization. Thus, three types of the signal intensity of the rotational polarization can be obtained from three inputs. Then, one cycle of each of three types of the rotational polarization has a maximum value of the signal intensity, and a direction determined by synthesizing the polarization direction of three types of the rotational polarization from which three maximum values are obtained indicates the polarization direction of the electromagnetic wave reaching the rotational polarization radio device 30.

The demodulation result of input signals from which three maximum values are obtained provides the ID of the transmitting radio terminal 20. Determination of the maximum value of three input signal intensities of the CPU 11 and the signal demodulation are carried out by a digital signal processing of the CPU 11.

Then, after demodulating the ID of the radio terminal 20 specified by the ID generation circuit 13, the CPU 11 determines the transmission timing of respective radio terminals 20 in the data transmission mode from the reaching polarization of the electromagnetic wave transmitted by respective radio terminals 20. In this operation, the CPU 11 determines the timing such that the number of radio terminals 20 capable of transmitting at the same timing becomes three at most.

The CPU 11 outputs a signal for transmitting information of the obtained ID and the transmission timing in an orthogonal format and inputs into the first mixer 18 via the first circulator 16 and into the second mixer 19 via the second circulator 17. Then, the signal is up-converted into the carrier wave frequency band by the first mixer 18 and the second mixer 19 and radiated to a space as the rotational polarization from the first antenna 32 and the second antenna 33.

After transmitting the ID, respective radio terminals 20 receive the incoming electromagnetic wave from the terminal antenna 22, down-convert in the terminal mixer 8, and cause the demodulator 7 to input the demodulation result into the terminal base band circuit 23 via the terminal circulator 6. The electromagnetic wave may not be converted by the terminal mixer 8, and instead, may be converted by the demodulator.

The terminal base band circuit 23 compares the demodulation result and the ID thereof with each other. When the demodulation result matches the ID thereof, the terminal base band circuit 23 causes the transmission time generator 4 to store information of the transmission timing included in the demodulation result and causes the change-over switch 3 to interlock output of the information signal generator 1 with the timer 5 and the switch 9. Then, the terminal base band circuit 23 shifts to the data transmission mode.

After transmitting the information the ID and the transmission timing obtained in the ID generation circuit 13, the rotational polarization radio device 30 shifts to the data transmission mode. Operation of the rotational polarization radio device 30 which has shifted to the data transmission mode is the same as the operation of the channel measurement mode except that the CPU 11 handles the inputted signal as data transmitted by respective radio terminals 20.

In handling of this data, a signal transmitted by at most three radio terminals 20 is reconfigured from three signals inputted into the CPU 11, which are signals received with three types of rotational polarizations, using a complex reception signal intensity stored in the channel measurement mode.

According to this embodiment, the rotational polarization radio device 30 and at most three radio terminals 20 in the same divided area perform radio communication with each other. Thus, deterioration of the communication quality caused by interference of signals transmitted by other radio terminals 20 may be prevented. Transmission of a plurality of radio terminals 20 at the same time improves the data transmission rate in the data transmission mode.

Seventh Embodiment

Figure 7:
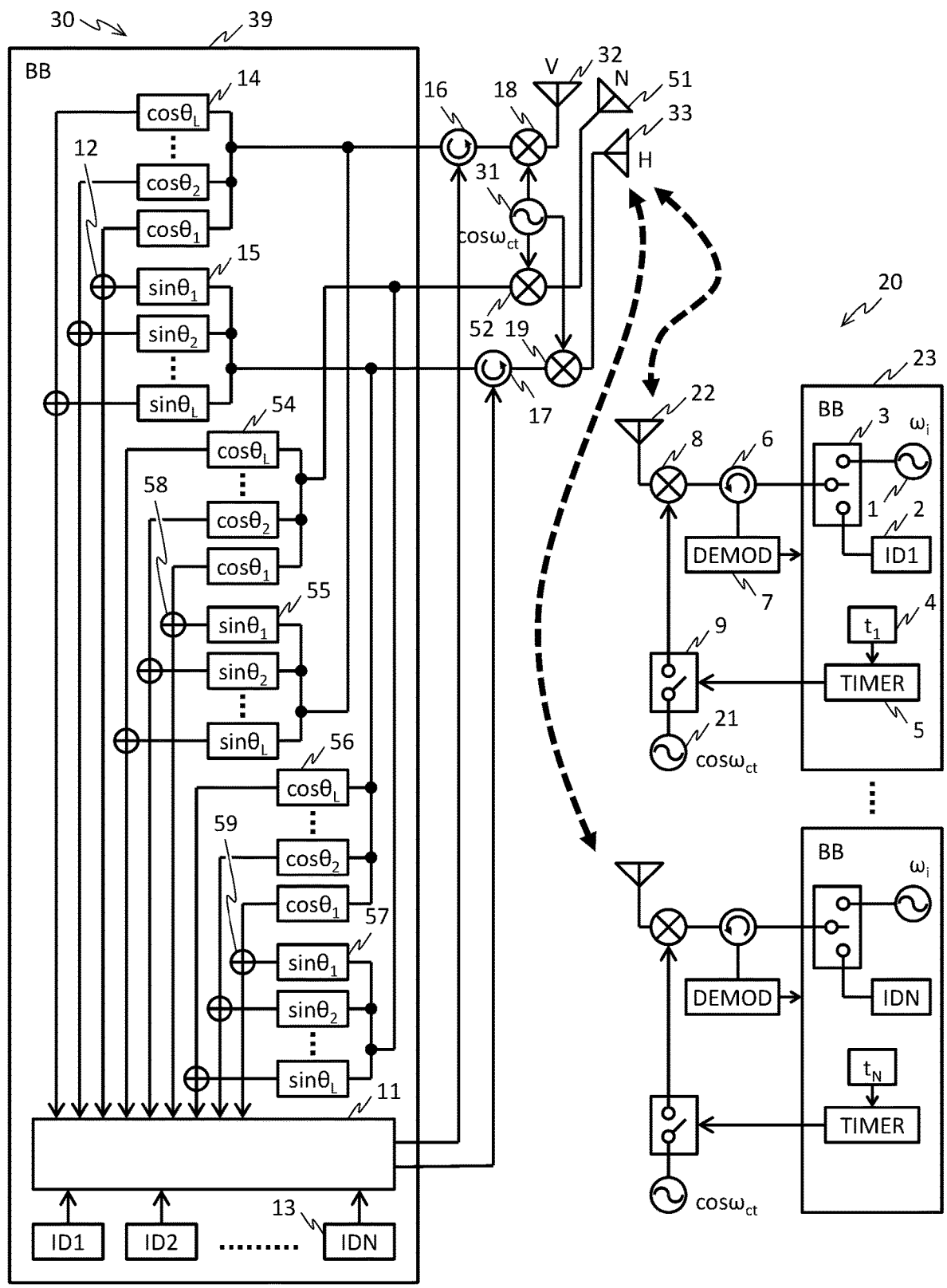
FIG. 7 illustrates another configuration example of the rotational polarization radio device.

In this embodiment, another configuration example of a plurality of fixedly installed radio terminals 20 and one rotational polarization radio device 10 is described. FIG. 7 illustrates a configuration example of a radio terminal 20 and a rotational polarization radio device 30. Radio terminals 20 illustrated in FIG. 7 are the same as the radio terminals 20 illustrated in FIG. 6. Description of components of the rotational polarization radio device 30 illustrated in FIG. 7, which are the same as those of the rotational polarization radio device 30 illustrated in FIG. 6, is omitted by assigning the same reference numerals.

The configuration of the rotational polarization radio device 30 in illustrated in FIG. 7 is different from the rotational polarization wave radio device 30 illustrated in FIG. 6 in that each of outputs of first terminals of the first circulator 16 and the second circulator 17 and outputs of the fifth mixer 52 is branched and inputted into a plurality of first cosine weight circuits 14, second cosine weight circuits 54 and third cosine weight circuits 56, and a plurality of first sine weight circuits 15, second sine weight circuits 55, and third sine weight circuits 57, which are incorporated into the base band circuit 39.

Outputs of a plurality of cosine weight circuits 14 and a plurality of sine weight circuits 15 having the same polarization angle, outputs of a plurality of cosine weight circuits 54 and a plurality of sine weight circuits 55 having the same polarization angle, and outputs of a plurality of cosine weight circuits 56 and a plurality of sine weight circuits 57 having the same polarization angle are added together by the synthesizer 12, the synthesizer 58, and the synthesizer 59, and inputted into the CPU 11.

The CPU 11 is coupled with the ID generation circuit 13 configured to output the ID of the radio terminal 20. Operation of the CPU 11 is the same as described with reference to FIGS. 3 and 6.

An aspect of the embodiment associates the reception polarization and the ID with each other with respect to a plurality of radio terminals 20 at a time of one cycle of the rotational polarization according to the first embodiment. Thus, the embodiment can reduce implementation time of the channel measurement mode compared with the sixth embodiment, and allows for improvement of the throughput at all times of the radio system or a time including the channel measurement time and the data transmission time.

Eighth Embodiment

In this embodiment, another configuration example of a plurality of fixedly installed radio terminals 20 and one rotational polarization radio device 30 is described. FIG. 8 illustrates a configuration example of the radio terminal 20 and the rotational polarization radio device 30. The radio terminal 20 illustrated in FIG. 8 is the same as the radio terminal 20 illustrated in FIG. 4. The rotational polarization radio device 30 illustrated in FIG. 8 is different from the rotational polarization radio device 30 illustrated in FIG. 7 in that the rotational polarization radio device 30 illustrated in FIG. 8 transmits the ID to the radio terminal 20.

More specifically, when communicating with a specific radio terminal 20 using a specific polarized wave at a time different from those of the other radio terminals 20, the rotational polarization radio device 30 transmits the ID of the specific radio terminal 20. Thus, the rotational polarization radio device 30 may select the specific radio terminal 20 with which the rotational polarization radio device 30 communicates. The rotational polarization radio device 30 illustrated in FIG. 8 is the same as the rotational polarization radio device 30 illustrated in FIG. 7 except the ID.

An aspect of this embodiment allows for simplification of the configuration of the radio terminal 20, and thereby allows for size and cost reduction of the radio terminal 20 in the same operation as in FIG. 7.

Ninth Embodiment

Figure 9:
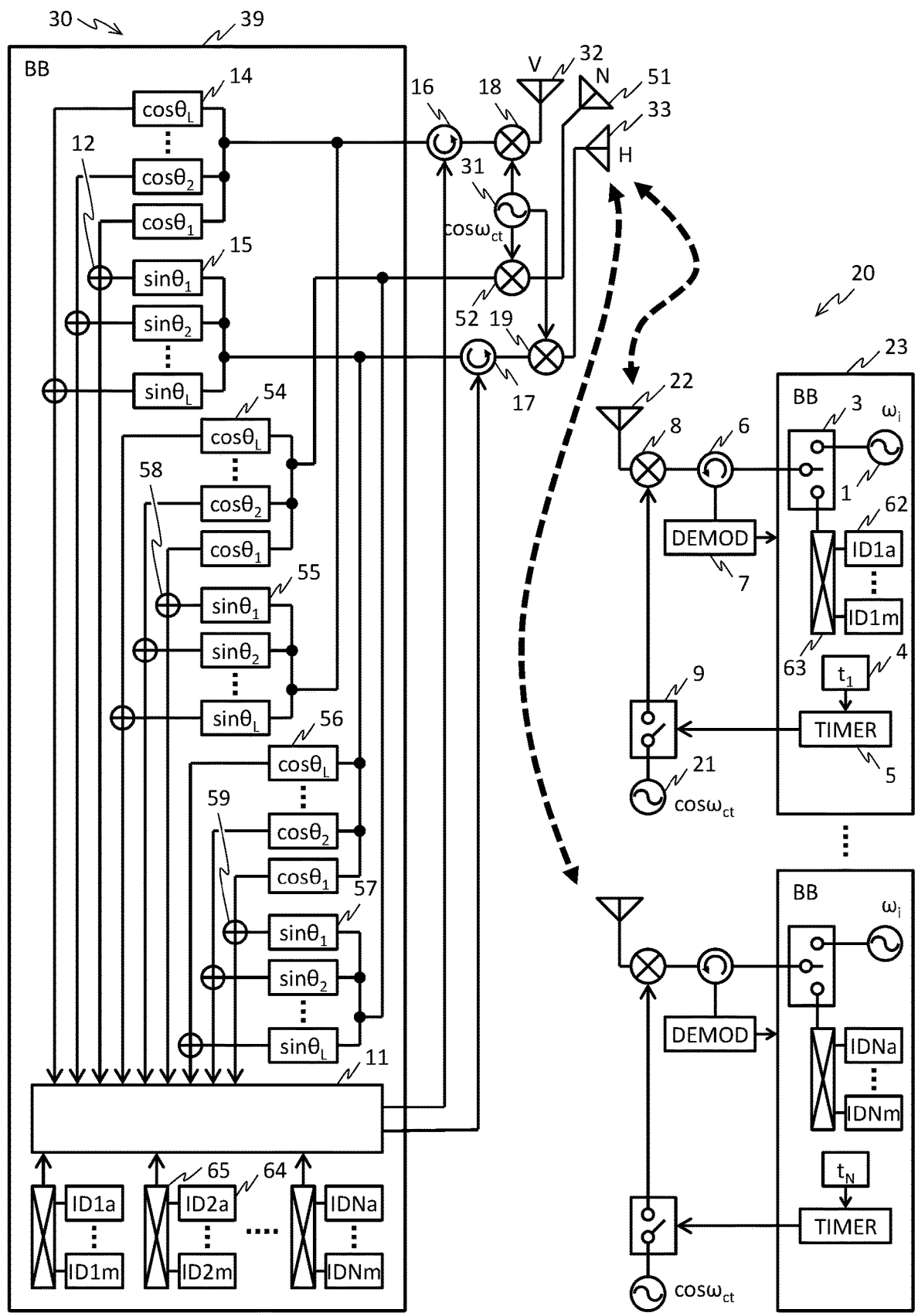
FIG. 9 illustrates another configuration example of the radio terminal and the rotational polarization radio device.

In this embodiment, another configuration example of a plurality of fixedly installed radio terminals 20 and one rotational polarization radio device 30 is described. FIG. 9 illustrates a configuration example of a radio terminal 20 and the rotational polarization radio device 30. Description of components same as those illustrated in FIG. 7 is omitted by assigning the same reference numerals.

The radio terminal 20 illustrated in FIG. 9 is different from the radio terminal 20 illustrated in FIG. 7 in that the radio terminal 20 illustrated in FIG. 9 includes a plurality of ID generators 62, each of which is configured to generate a low cross correlation ID encoded (for example, orthogonal code) so as to have a cross correlation property lower than others. Then, one of the plurality of ID generators 62 is selected by a selector 63 and changed over to an information signal generator 1 by the change-over switch 3.

The rotational polarization wave radio device 30 illustrated in FIG. 9 is different from the rotational polarization wave radio device 30 illustrated in FIG. 7 in that the rotational polarization wave radio device 30 illustrated in FIG. 9 has a configuration coupling with each other the ID generator 64 and the selector 65 corresponding to the ID generator 62 and the selector 63 of each of radio terminals 20 within the base band circuit 39 in order to share a low cross correlation ID generated by a plurality of ID generators 62 provided in a plurality of radio terminals 20.

The rotational polarization wave radio device 30 transmits a signal specifying the low cross correlation ID used by the radio terminal 20 in order to measure signal intensity to three or more radio terminals 20 at the same time (same divided area) within one cycle of the rotational polarization.

For this reason, first, each of radio terminals 20 shuts down output of the terminal carrier wave frequency generator 21 by the switch 9 to put in the reception state, and the rotational polarization wave radio device 30 selects the ID generator 64 by the selector 65 based on a predetermined plurality of pairs of low cross correlation IDs and transmits a signal specifying the low cross correlation ID used by each of radio terminals 20.

Since the transmission signal of the low cross correlation ID reaches from one rotational polarization wave radio device 30, each radio terminal 20 can identify the low cross correlation ID used thereby in a reliable manner in a favorable communication environment free of interference waves. Subsequently, a plurality of radio terminals 20 encode and transmit each low cross correlation ID in a random manner.

The encoded IDs have low cross correlation with each other. Thus, even when encoded IDs reach the rotational polarization wave radio device 30 at the same time, the rotational polarization wave radio device 30 can measure the polarized wave received at the maximum signal intensity and the complex reception signal intensity in the polarized wave for every radio terminal 20 using a correlation property of the code.

An aspect of this embodiment improves measurement precision of the radio communication between the rotational polarization wave radio device 30 and each radio terminal 20. Thus, the rotational polarization wave radio device 30 may improve the quality of individual signals reconfigured from signals transmitted from each radio terminal 20.

Also, the transmission time deviation among IDs transmitted by radio terminals 20 can be reduced, allowing improvement of the data transmission rate of the radio system over entire time of the radio channel measurement mode and the data transmission mode.

Tenth Embodiment

Figure 10:
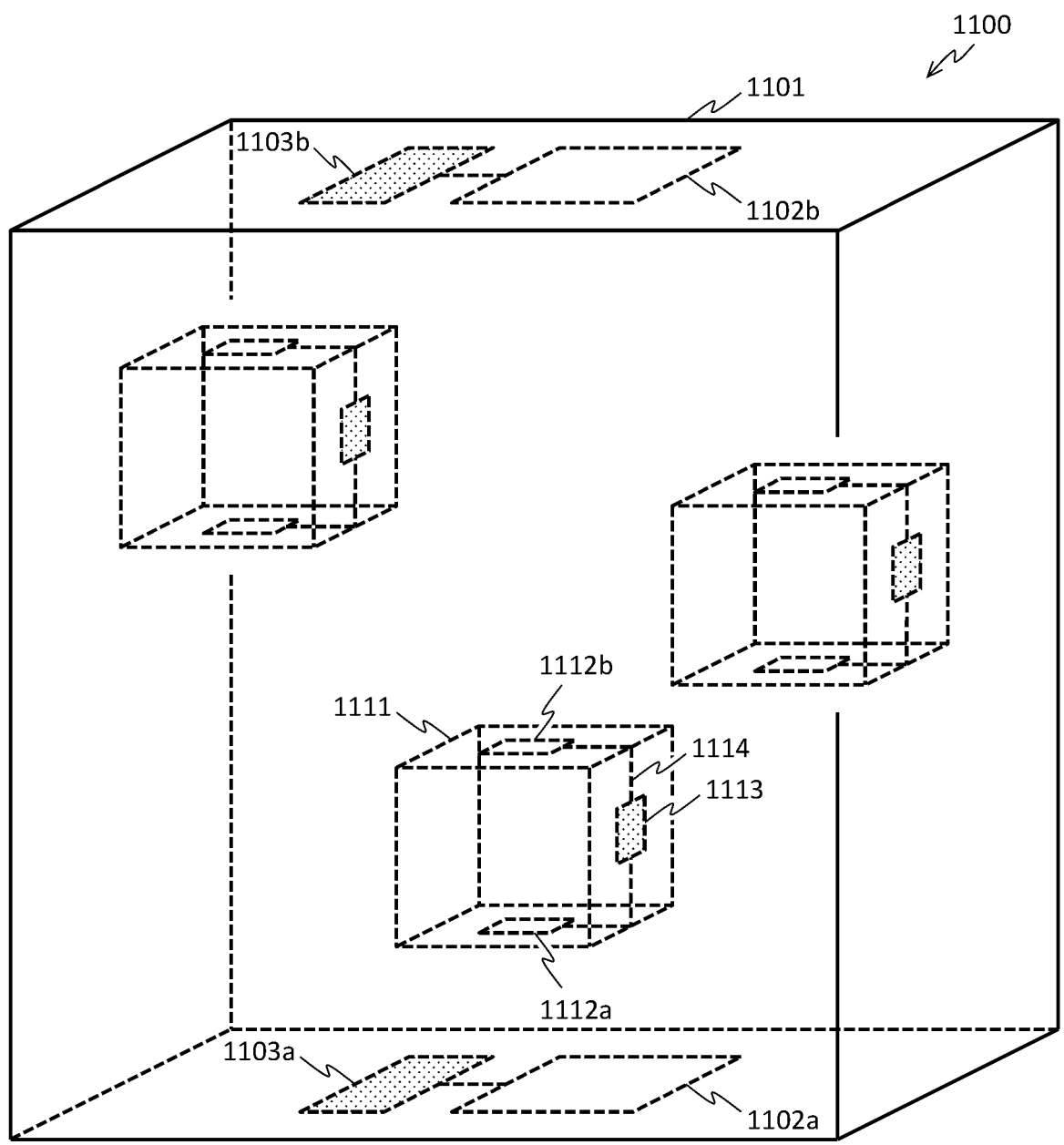
FIG. 10 illustrates an elevator monitoring control system to which the rotational polarization radio device is applied.

In this embodiment, another example of a radio system including a plurality of radio terminals and two rotational polarization radio devices is described. FIG. 10 illustrates an example of an elevator monitoring control system to which a radio system including a plurality of radio terminals and two rotational polarization radio devices is applied.

An elevator monitoring and control system 1100 according to this embodiment is configured to monitor and control a plurality of elevator cars 1111 configured to move up and down inside a building 1101 where the elevator is installed. A floor section and a ceiling section inside the building 1101 are provided with base station rotational polarization wave radio devices having rotational polarization functions 1103a and 1103b and base station two-orthogonal polarization integral antennas 1102a and 1102b, which are coupled with each other.

An external ceiling and an external floor surface of the elevator car are respectively provided with terminal station two-orthogonal polarization integral antennas 1112a and 1112b, which are coupled with the radio terminal device 1113 using a high frequency cable 1114. Radio communication between the base station rotational polarization radio device 1103 and the radio terminal device 1113 is performed with the inside of the building 1101 as a radio transmission medium. Thus, the electromagnetic wave is multiplex-reflected by an inner wall of the building 1101 and an outer wall of the elevator car 1111.

This multiplex-reflection does not always cause a plurality of electromagnetic waves radiated by terminal station two-orthogonal polarization integral antennas 1112a and 1112b of a plurality of the radio terminal devices 1113 at different locations inside the building 1101 to become the same polarized waves when reaching base station rotational polarization wave radio devices 1102a and 1102b of base station rotational polarization wave radio devices 1103a and 1103b.

Each electromagnetic wave 1111 changes the position thereof when moving up and down. Thus, the polarized wave of the electromagnetic wave radiated by terminal station two-orthogonal polarization integral antennas 1112a and 1112b of one elevator car 1111 also may change when reaching orthogonal polarization integral antennas 1102a and 1102b.

For solving the problem, each of base station rotational polarization wave radio devices 1103a and 1103b is substituted for the rotational polarization radio device 10 illustrated in the first to fourth embodiments; each of base station rotational polarization wave radio devices 1102a and 1102b is substituted for the first antenna 32 and the second antenna 33 described in the first to fourth embodiments; and the radio terminal device 1103 is substituted for the radio terminal 20 described in the first to fourth embodiments.

Then, two antennas are coupled with the terminal mixer 8 instead of the terminal antenna 22 described in the first to fourth embodiments, and terminal station two-orthogonal polarization integral antennas 1112a and 1112b operate as the two antennas. When the elevator car 1111 stops, terminal station two-orthogonal polarization integral antennas 1112a and 1112b determine the stop and implement the channel measurement mode and the data transmission mode described in the first to fourth embodiments. In the data transmission mode, data for monitoring and controlling is communicated.

According to this embodiment, even an elevator monitoring control system which is difficult to estimate the transmission path of the electromagnetic wave can perform reliable radio communication by implementing processing of the channel measurement mode and the data transmission mode at a time when polarized waves of electromagnetic waves radiated by terminal station two-orthogonal polarization integral antennas 1112a and 1112b are fixed when reaching base station two-orthogonal polarization integral antennas 1102a and 1102b.

Then, control and monitoring of the elevator car 1111 can be implemented without using a wired connection. This eliminates necessity of cables for the wired connection, and thereby allows for the same transport capability with a smaller building cubic volume or allows improvement of the transport capability by increasing dimensions of the elevator with the same building cubic volume.

Eleventh Embodiment

In this embodiment, another example of a radio system including a plurality of fixedly installed radio terminals and one rotational polarization radio device is described. FIG. 11 illustrates an example of a transforming facility monitoring control system to which a radio system including a plurality of fixedly installed radio terminals and one rotational polarization radio device is applied.

A transforming facility monitoring control system 1200 according to this embodiment includes a plurality of transforming apparatus 1201. Each transforming apparatus is provided with a radio terminal device 1203 and a radio terminal device two-orthogonal polarization integrated antenna 1202 coupled with each other. A radio base station 1221 is installed near a plurality of transforming apparatuses 1201. The radio base station 1211 includes a rotational polarization radio device 1213 and a rotational polarization radio device two-orthogonal polarization integral antenna 1212, which are coupled with each other.

The dimensions of the transforming apparatus are on the order of several meters, which is overwhelmingly larger compared with a wavelength corresponding to several megahertz (MHz) to several gigahertz (GHz) being a frequency of the electromagnetic wave radiated from a radio terminal device two-orthogonal polarization integral antenna 1202 and a rotational polarization radio device two-orthogonal polarization integral antenna 1212.

For this reason, the electromagnetic wave is multiplex-reflected by a plurality of transforming apparatuses 1201 to form a multiple wave interference environment. Then, a plurality of electromagnetic waves radiated from the radio terminal device two-orthogonal polarization integral antenna 1202 of the radio terminal device 1203 fixedly installed in each of the transforming apparatuses 1201 reach the rotational polarization radio device two-orthogonal polarization integral antenna 1212 installed in the radio base station 1211 with difference polarized waves.

For solving the problem, the rotational polarization radio device 1213 is substituted for the rotational polarization radio device 10 illustrated in the first to fourth embodiments; the rotational polarization radio device two-orthogonal polarization integral antenna 1212 is substituted for the first antenna 32 and the second antenna 33 described in the first to fourth embodiments; and the radio terminal device 1201 is substituted for the radio terminal 20 described in the first to fourth embodiments. Further, the radio terminal device two-orthogonal polarization integral antenna 1202 is substituted for the terminal antenna 22 described in the first to fourth embodiments to execute processing of the channel measurement mode and the data transmission mode described in the first to fourth embodiments. In the data transmission mode, data for monitoring and controlling is communicated.

This embodiment enables reliable radio communication between the rotational polarization radio device 1213 and a plurality of radio terminal devices 1203. Thus, control and monitoring of the transforming apparatus 1201 can be implemented from the radio base station 1211 using a radio communication but not a wired connection.

This solves the problem of the high pressure inductive power arising when using a cable or the like in the wired connection, and thereby reduces installation costs of the cable or the like.

Modes for carrying out the present invention are not limited to each of the embodiments described above. For example, a part of an embodiment may be added to another embodiment, or a part of an embodiment may be replaced with a part of another embodiment.

What is claimed is:
1. A radio communication system configured to communicate with electromagnetic waves, the radio communication system comprising:

a plurality of slave stations, each configured to transmit and receive an electromagnetic wave using a fixed polarization wave; and a master station including an antenna and a base band circuit, the master station configured to transmit and receive an electromagnetic wave using a rotational polarization wave and identify a polarization direction of an electromagnetic wave reaching the antenna and a slave station transmitting the electromagnetic wave, and notify an identified slave station of a communication timing based on the identified polarization direction;

wherein the plurality of slave stations include a plurality of slave stations arranged such that electromagnetic waves transmitted from a plurality of slave stations among the plurality of slave stations reach the antenna of the master station in a plurality of different polarization directions;

wherein each of the plurality of slave stations is configured to transmit an electromagnetic wave including identification information of each slave station, and a base band circuit of the master station is configured to:
identify a polarization direction of the electromagnetic wave reaching the antenna based on a direction in which reception intensity of the electromagnetic wave is the maximum among a plurality of polarization directions of electromagnetic waves received by the antenna;

identify a slave station transmitting the electromagnetic wave based on identification information included in a signal of the electromagnetic wave received by the antenna; and output a timing at which the master station communicates in an identified polarization direction to the antenna so as to notify the identified slave station;

wherein the antenna of the master station includes a first antenna and a second antenna, a polarization direction of the electromagnetic wave transmitted and received by the second antenna being orthogonal to the first antenna; and the base band circuit of the master station is configured to identify a direction in which reception intensity of the electromagnetic wave is the maximum among a plurality of polarized waves of the electromagnetic wave received by the antenna based on a signal from the first antenna and a signal from the second antenna, and identify the polarization direction of the electromagnetic wave reaching the antennas;

wherein the base band circuit of the master station is configured to cause the polarization direction of the electromagnetic wave transmitted and received by the antenna to repeatedly rotate, based on a signal inputted and outputted by the first antenna and a signal inputted and outputted by the second antenna, and each of the plurality of slave stations is configured to transmit the electromagnetic wave of a signal including identification information of each slave station while rotating the polarization direction by one cycle in a rotation in a different polarization direction changed by the base band circuit of the master station.

2. The radio communication system according to claim 1, wherein the base band circuit of the master station is configured to:
when identified that a plurality of identified slave stations have transmitted electromagnetic waves in the same polarization direction, output a timing at which the master station communicates in an identified polarization direction in one rotation of the polarization direction, to the antenna so as to notify one slave station among the plurality of identified slave stations; and output a timing at which the master station communicates in an identified polarization direction by another rotation of the polarization direction, to the antenna so as to notify another slave station among a plurality of identified slave stations.

3. The radio communication system according to claim 2, wherein each of the plurality of slave stations is configured to transmit an electromagnetic wave of the signal up-converted into a carrier wave frequency band, and the base band circuit of the master station is configured to change the polarization direction of electromagnetic wave received by the antenna such that the polarization direction rotates repeatedly at a frequency lower than a carrier wave frequency, based on a signal from the first antenna down-converted from a carrier wave frequency band, and a signal from the second antenna down-converted from the carrier wave frequency band.

4. The radio communication system according to claim 3, wherein each of the plurality of slave stations is configured to:
transmit the electromagnetic wave of a signal including identification information of each slave station in the channel measurement mode; and when a communication timing is notified by the master station, communicate data with the master station in accordance with a communication timing notified by the master station in a data transmission mode.

5. The radio communication system according to claim 1, wherein the base band circuit of the master station includes:
a plurality of cosine weight circuits, each corresponding to a different angle of the polarized wave; and a plurality of sine weight circuits, each corresponding to a different angle of the polarized wave, the base band circuit of the master station is configured to:
input a signal from the first antenna into the plurality of cosine weight circuits and a signal from the second antenna into the plurality of sine weight circuits;

add outputs of a cosine weight circuit and a sine weight circuit, each of which corresponds to the angle of the polarized wave, among outputs of the plurality of cosine weight circuits and outputs of the plurality of sine weight circuits; and identify the polarization direction of the electromagnetic wave reaching the antenna based on an addition result for every plurality of angles of the polarized wave.

6. The radio communication system according to claim 1, wherein the master station includes:
a third mixer configured to synthesize an output of a rotational polarization frequency cosine generation circuit between the first antenna and the base band circuit; and a fourth mixer configured to synthesize an output of a rotational polarization frequency sine generation circuit between the second antenna and the base band circuit, and the base band circuit of the master station includes:
a first delay circuit array being a plurality of stages of delay circuits, the delay circuits configured to receive a signal from the third mixer; and a second delay circuit array being a plurality of stages of delay circuits, the delay circuits configured to receive a signal from the fourth mixer, and the base band circuit of the master station is configured to:

add outputs of two delay circuits having the same delay amount of the first delay circuit array and the second delay circuit array; and identify the polarization direction of the electromagnetic wave reaching the antenna.

7. The radio communication system according to claim 6, wherein the base band circuit of the master station is configured to output a signal including identification information of an identified slave station to the antenna, the antenna is configured to notify an identified slave station of a timing at which the master station communicates by transmitting the electromagnetic wave of a signal including identification information of an identified slave station, and each of the plurality of slave stations is configured to communicate data with the master station based on a comparison result between identification information of each slave station and identification information included in a signal received from the master station.

8. The radio communication system according to claim 1, wherein the antenna of the master station includes:

a third antenna where a polarization direction of transmitted and received electromagnetic is orthogonal to the first antenna and the second antenna, and the base band circuit of the master station is configured to identify the direction in which reception intensity of the electromagnetic wave is the maximum among the plurality of directions of polarized waves of the electromagnetic wave received by the antenna based on the signal from the first antenna, the signal from the second antenna, and a signal from the third antenna, and identify polarization direction of the electromagnetic wave reaching the antennas.

9. The radio communication system according to claim 8, wherein the base band circuit of the master station is configured to when identified that a plurality of identified slave stations have transmitted electromagnetic waves in the same polarization direction, output one timing at which the master station communicates in an identified polarization direction to the antenna so as to notify at most three slave stations among a plurality of identified slave stations.

10. The radio communication system according to claim 8, wherein the base band circuit of the master station includes:

a first cosine weight circuit group, a second cosine weight circuit group, and a third cosine weight circuit group, each including a plurality of cosine weight circuits corresponding to a different angle of the polarized wave; and a first sine weight circuit group, a second sine weight circuit group, and a third cosine weight circuit group including a plurality of sine weight circuits corresponding to a different angle of the polarized wave, and the base band circuit is configured to:

input a signal from the first antenna into the first cosine weight circuit and the second sine weight circuit;

input a signal from the second antenna into the third cosine weight circuit and the first sine weight circuit;

input a signal from the third antenna into the second cosine weight circuit and the third sine weight circuit;

add outputs of two circuits of a cosine weight circuit and a sine weight circuit, each of the cosine weight circuit the sine weight circuit corresponding to the same angle of the polarized wave, among outputs of the plurality of cosine weight circuits of the first cosine weight circuit group and outputs of the plurality of sine weight circuits of the first sine weight circuit group;

add outputs of two circuits of a cosine weight circuit and a sine weight circuit, each of the cosine weight circuit and the sine weight circuit corresponding to the same angle of the polarized wave, among outputs of the plurality of cosine weight circuits of the second cosine weight circuit group and outputs of the plurality of sine weight circuits of the second sine weight circuit group;

add outputs of two circuits of a cosine weight circuit and a sine weight circuit, each of the cosine weight circuit and the sine weight circuit corresponding to the same angle of the polarized wave, among outputs of the plurality of cosine weight circuits of the third cosine weight circuit group and outputs of the plurality of sine weight circuits of the third sine weight circuit group; and identify the polarization direction of the electromagnetic wave reaching the antenna based on addition results for every plurality of angles of the polarized wave.

* * * * *